June 21, 1938.  G. J. NORD  2,121,210
PROCESS OF AND APPARATUS FOR ISOLATING AND TREATING THE
FIBERS OF LECHUGUILLA PLANT AND RELATED SPECIES
Filed Jan. 22, 1936  2 Sheets-Sheet 1

Inventor:
Gustav Jean Nord,
By Parker Cook
Attorney

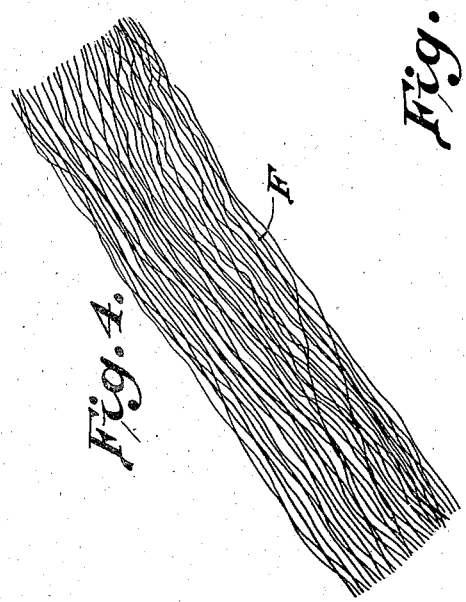
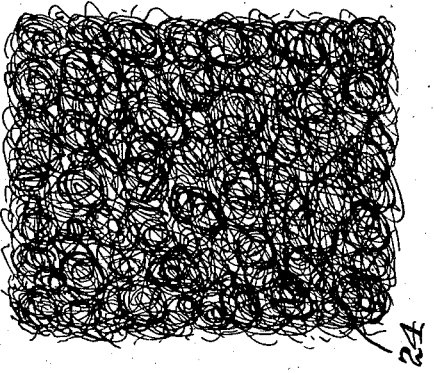
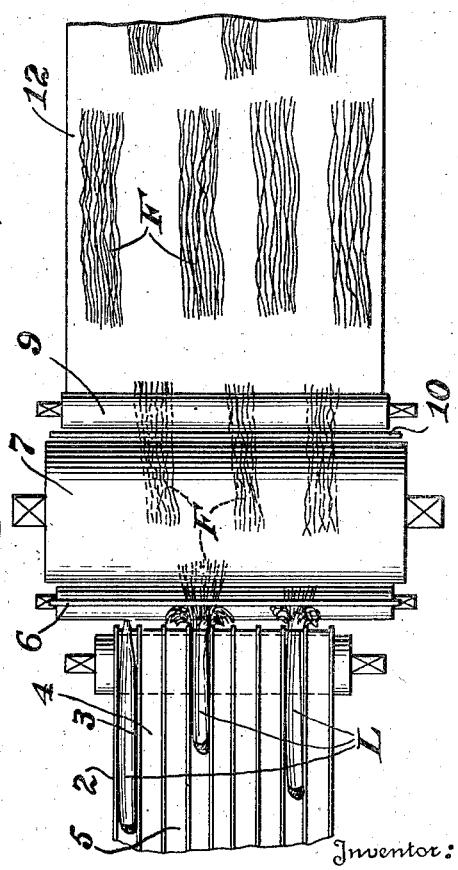
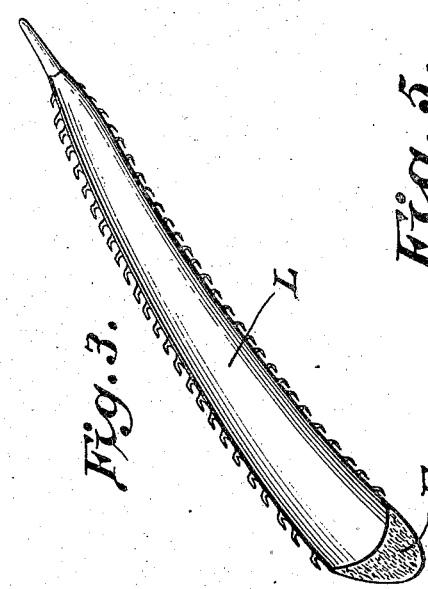

Patented June 21, 1938

2,121,210

UNITED STATES PATENT OFFICE 2,121,210

PROCESS OF AND APPARATUS FOR ISOLATING AND TREATING THE FIBERS OF LECHUGUILLA PLANT AND RELATED SPECIES

Gustav Jean Nord, Asheville, N. C.

Application January 22, 1936, Serial No. 60,335

6 Claims. (Cl. 19—8)

My invention relates to new and useful improvements in a process of and apparatus for extracting or isolating the fibers from lechuguilla and related filiferous species of the agave plant. The fibers extracted from lechuguilla or other species of agave plant are classified as "structural fibers", meaning that they are obtained from the leaves of monocotyledonous plants, or inside growers, occurring as isolated fibrovascular bundles which are surrounded by a pithy, spongy, cellular mass covered with a relatively thick epidermis.

An object of the invention is to isolate these vegetable fibers so that they may be used as a substitute for horsehair, cotton felts, Spanish moss, or similar stuffing material that is now used in the manufacture of furniture stuffing, mattresses, etc.

Another object of the invention is to produce a fiber hair by a decomposing process and mechanical means, about to be outlined, which will produce fibers superior to certain animal hairs and other stuffing material. As is well known, animal hair may, during hot weather, give off offensive odors and is often subject to infestation by vermin.

Still another object of the invention is to produce a vegetable fiber that will have the desirable resilient properties and, in other ways, be far superior to some of the animal hair now in use.

Still another object of the invention is to provide a method or process which incorporates the use of first steaming the leaves, which results in three distinct advantages.

As is well known to those skilled in the art, this agave plant has a certain percentage of calcium derivatives therein, which are extracted from the soil and, if left in fibers, would have a deleterious action. In other words, the fibers, if not thoroughly steamed, would have a tendency to shortly become brittle and break and lose the desired resiliency.

Secondly, these agave plants, as well as others, have a small percentage of acid therein, which, likewise, is detrimental to a hair fiber if left therein. This is apparently so, due to the fact that the acid would later tend to crystallize and in that way have a destructive action.

Thirdly, I have found that by first subjecting the leaf to steam or steam pressure, the pithy or parenchymous part of the leaf is broken down or softened, so that the cellulose fibers may be more completely isolated and separated from the leaf.

Still another object of the invention is to provide a method or process for the manufacture of a fiber hair that will be extremely resilient in its nature and will retain this resiliency even after long use.

Still another object of the invention is to provide a method of isolating and treating the fiber, so that the same will be free of any calcium derivatives, free of acid, will readily take a dye or bleach, will retain its resiliency, and the fibers will have the curl necessary so that they may be properly baled, formed into pads or otherwise bundled for stuffing purposes.

Still another object of the invention is to initially treat the leaf to a decomposing steam bath and thereafter pass the leaf between scrapers to remove the incrusting vegetable matter. Furthermore, I have found it preferable to not only run the leaf through scrapers but, at the same time, subject it to pressure rolls, which will have a tendency to spread the fibers and also free them of the parenchymous pulp. After the leaf has been subjected to this decomposing steam bath and the scrapers and pressures, the fibers will be in an isolated spread condition. After this, they are to be properly washed, subjected to a picking and preliminary drying action, which latter will drive off any remaining deleterious chemical constituents, and then finally dried in an agitator.

Still another object of the invention is to produce a fiber approximating the pure cellulose, as the more closely the fibers approach this stage the greater the tendency they will have to curl and remain resilient in contradistinction to a fiber that is highly lignified.

Still another object incident to this steaming action of the leaf is that the fibers, when recovered, are in a sterile condition and need no further treatment to remove any toxic properties.

Still another object of the invention is to isolate and treat the fiber from the lechuguilla plant, the cellular structure of which fibers is particularly adaptable for the purposes desired.

In a number of other plants from which fibers have been extracted, it has been found that the inherent structure of the fiber is such that it will not tend to curl or give the desired resiliency, inasmuch as the fibers have occurring at different points throughout their length nodes, which will have a tendency to cause the fibers to break under pressure at these nodes rather than permitting them to curl in the manner which is true of the lechuguilla fiber.

Still another object of the invention is to isolate the fiber and treat the lechuguilla plant while still in its green state, which makes it possible to do away with subsequent treatments that would be necessary if the plant were acted upon when dry, and furthermore, it makes it possible to obtain the pulp, which is available as a by-product, inasmuch as it is high in saponin contents.

With these and other objects in view, the invention consists in certain new and novel features, as will be hereinafter more fully explained and pointed out in the claims.

In the drawings showing, in a diagrammatic way, a preferred embodiment of the apparatus for carrying out my process, Fig. 1 is a diagrammatic top plan view of the apparatus for carrying out the process;

Fig. 3 shows a leaf of the lechuguilla plant as cut from the head;

Fig. 4 is a view of the fibers after being removed from the leaf;

Fig. 5 is a fragmentary top plan view showing the leaves being passed through the scrapers and rollers to remove the incrustations and parenchymous pulp and liberating the fibers;

Fig. 6 is a plan view showing how the fibers will appear when baled for padding purposes.

Figure 1:
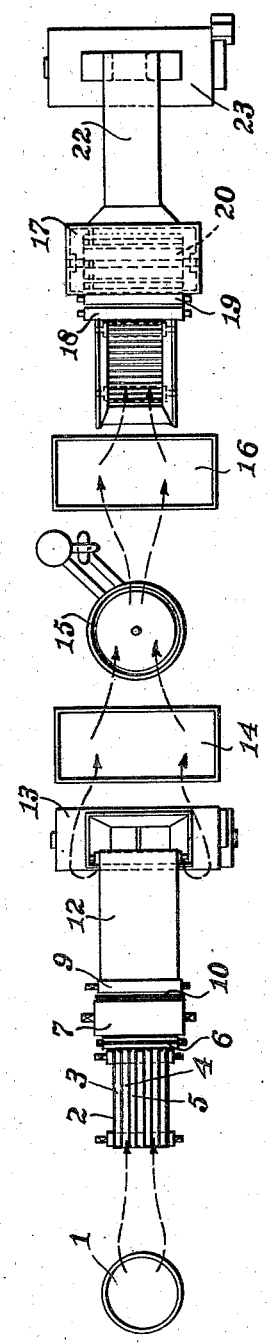
Figure 2:
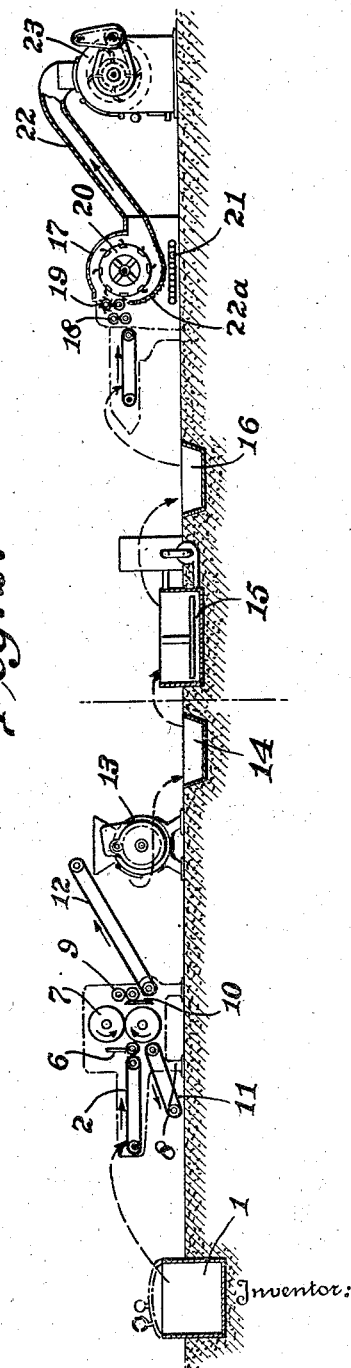
Fig. 2 is a side elevational view of the same.

Referring now more particularly to Figs. 1 and 2, there is shown a steamer or pressure cooker 1, in which the green leaves L of the lechuguilla plant are to be placed. The steam under pressure is retained in this cooker and I have found that the leaf will be thoroughly decomposed if steamed for approximately one hour's treatment, although, of course, the pressure and the time may be varied to suit the condition of the plant. That is, at certain times of the year, the moisture content of the fibers will be greater than at other times, and the amount of steaming necessary can be properly determined at the time of harvesting the leaf.

As heretofore mentioned, the steaming of the leaf is extremely important, as not only does it break down the incrustation about the fibers but its also frees the fibers of any calcium derivatives and of any lignified components, besides making the fibers sterile.

Furthermore, the fibers, by being subjected to the steam pressure, approach the true cellulose stage, which is extremely desirable, as the more closely the fiber approximates the pure cellulose, the greater becomes its flexibility and elasticity.

It is to be understood at the outset that it is very desirable to have the fibers extremely resilient and flexible so that when baled, they may be used as flexible and resilient stuffing for furniture, mattresses, and other articles wherein cotton pads, horsehair, and similar fibers are used today.

After the leaves have been thus properly treated in the steamer or cooker, they are then placed on an endless conveyor apron, which, as may be seen in Fig. 1, may be divided to provide the separate spaces 3, 4, 5, etc., into which spaces the leaves will be placed in a longitudinal position to be fed to the scrapers 6 and to the pressure rolls 7. These rolls and scrapers are mounted on the base 8, as may be seen in Figs. 1 and 2. After the leaves pass through these pressure rolls, they are engaged by the delivery rolls 9, having passed the scraper 10 just in front of the delivery rolls.

I have found that it is desirable to have these delivery rolls travel at a greater speed than the pressure rolls, so that there is no possibility of the then-isolated fibers encircling the feed rolls. The scrapers 6 and 10 will remove the epidermis and incrusting vegetable matter from the leaf, which latter will drop through the base of the machine to a conveyor 11 for further disposal.

I have also found in the practicing of the process that it is possible to remove the epidermis and the parenchymous pulp from the leaf by just utilizing scrapers rather than scrapers and feed rolls, especially if the scrapers are placed in close proximity, but I have further found it preferable to use the scrapers in combination with pressure rolls, as the pressure rolls not only have a tendency to spread and isolate the fibers but also more efficiently remove the parenchymous pulp.

In Fig. 5, I have shown a fragmentary portion of the conveyor apron 2 with several of the leaves L placed thereon and showing the manner in which the fibers F have a tendency to isolate and spread as they are subjected to the pressure rolls 7. After the fibers have passed the scraper 6, the pressure rolls 7, and rolls 9, they may be delivered to a further conveyor apron 12, which, in turn, will deliver them to a washer 13.

It will be understood that although I have shown only one scraper 6 to the front of the pressure rolls 7 and one scraper 10 to the rear of the pressure rolls, any desired arrangement of these scrapers might be utilized, the object being, of course, to remove the epidermis and vegetable and parenchymous pulp, so that the fibers will be in as clean a condition as possible by the time they reach the washing machine.

Any form of desired washer 13 may be used and the fibers should be left in the machine until such time as all the adhering foreign matter is washed free from them.

The fibers F in due course are then removed from the washing machine and deposited temporarily in the storage pit 14. As also may be seen in Fig. 2, preferably in line with the storage pit there is arranged a dyeing or bleaching apparatus 15, and if the fibers F are to be bleached, they will be treated with sodium hypochlorite or any other desired bleaching agent. As a general thing, however, rather than bleaching these fibers, they will be dyed and to any desired color. The dyeing per se does not enter into the invention, and it will be understood that any form of vegetable or acid dye may be used.

After the fibers have been either dyed or bleached, they will then be deposited into a further drainage pit 16. From this drainage pit 16, they are to be removed while still in a moist condition to what is known in the trade as a "wet picker" or "opener", which I have designated by the numeral 17. It will be understood that any desired form of picker may be used, but I have found in the practical carrying out of the process that it is well to have one wherein there are the double set of feed rolls 18 and 19, the fibers being then subjected to the action of the spiked cylinder 20 to thereby thoroughly separate the same.

It is also desirable to have a preliminary drying associated with this wet picker and I have diagrammatically shown a heating coil 21 beneath the screen 22 of the picker. The purpose of this preliminary drying is that if the fibers are subjected to a preliminary heating while in the moist state, the heat will tend to drive off any remaining chemical residues in the fiber.

I have further found in actual practice that by subjecting the fibers to the preliminary heating and drying while in a moist and separated state, they will curl far more readily when finally submitted to the drying.

The now preliminarily dried and separated fibers will then be blown through the conveyor pipe 22 into the final drier 23. Any form of drier may be used, but I prefer a drier of the rotary or tumbler action with an agitator therein, so that the fibers while being dried will be rotated or tumbled and kept separated.

I have found especially that the agitation of the fibers while in this drier will cause them to more readily curl, which is very desirable, as the curled fibers make up the resiliency of the pad when baled.

I have not shown a baler, but it will be understood that after the fibers are removed from the drier, they may be compressed into pads, as shown by the pad 24 in Fig. 6. It will also be understood that they may be compressed into any sized pads, blankets, or bales, depending on what form the customer desires them.

It might be mentioned here that I have found that these fibers may also be used for spinning purposes, as in the manufacture of rope, twine, and kindred articles, and when so used, it may or may not be necessary to put them into the bleacher 15 and it will not be necessary to put them into the wet picker or drier, as they may be dried in the sun or open air. In other words, it is not necessary or desirable when these fibers are used for the manufacture of rope, etc., that they be curled.

I have further found that from the lechuguilla plant or its associated species, a very desirable fiber may be isolated and treated, due to the fact that the fiber from the lechuguilla plant is particularly free of fissures or nodes and will properly curl when subjected to their final action, that is, the drying action, which is not true of the fibers of numerous fleshy-leaf plants. If the fibers have the fissures or nodes therein, even if they do curl, they are likely to break at the fissures or nodes.

It will also be appreciated that the process which I have herein set forth is one that is of great commercial value, in that there is no necessity for processing the fibers with acids or other chemicals. The decomposing of the leaf by the use of steam under pressure renders soluble the parenchymous pulp and other incrusting matters and also makes the fibers sterile.

If ever desired, the fibers could be further sterilized and purified before their dye and bleach, but I have found this in actual practice to be unnecessary.

Also, by using the steam treatment outlined, the fibers are reduced to nearly a true form of cellulose, which is extremely important where fibers are to be used for the purposes outlined, the cellulose fiber being much more resilient and flexible than a fiber that is highly lignified.

From the foregoing, it will be seen that I have produced a process and apparatus for isolating, treating, and curling the fiber from the leaf of the lechuguilla plant, which, when so isolated and treated, makes a commercially valuable padding to take the place of the animal fibers which are in use today.

Many of the animal fibers, especially from the goat, hog, and cattle, even though subjected to chemical treatments, will subsequently become brittle, lose their effective resiliency, and are frequently subject to vermin.

On the other hand, the fibers I have produced by the above process and apparatus, being freed of their calcium derivatives, lignified components, and other foreign matter, will remain resilient throughout their use, are sterile, and will curl readily to provide the desired resiliency when compressed and baled.

In conclusion, it might be stated that I do not wish to be limited to the exact apparatus diagrammatically illustrated as many slight changes might be made without in any way departing from the spirit and scope of the invention.

Having thus described my invention what I claim as new and desire to secure by Letters Patent is:—

1. The process of isolating and treating fiber of the agave plant, which consists in first subjecting the leaf to a steam bath, then subjecting the leaf to pressure to spread the fibers and separate the same from the skin and parenchymous tissue, washing the isolated fibers, subjecting the fibers to an opener or picker while the fibers are still in their moist state, and finally subjecting the fibers to a drier and agitating them to thereby curl the said fibers.

2. The process of securing, treating, and curling the fibers of monocotyledonous fibrous plants, which consists in subjecting the leaf to a steam pressure, then subjecting the so-treated leaf to the action of scrapers and pressure rolls to remove the matter other than the fibers, subjecting the fibers to a washing action, then subjecting the washed fibers to a picker or opener, and finally subjecting the picked or separated fibers to heat and agitating them while being subjected to the heat.

3. The process of separating the fibers of monocotyledonous fibrous plants, which consists in subjecting the green leaf to a steam pressure to break down the tissues but not the fibers, subjecting the fibers to scrapers and pressure rolls, then subjecting the fibers to a washing action, then subjecting the washed fibers to a bleach or dyeing action, subjecting the bleached or dyed fibers to a separator and to a preliminary drying while in the separator, and finally subjecting the preliminarily dried fibers to a final drying action.

4. The process of extracting and treating the fiber of the lechuguilla plant and causing the same to curl, which consists in subjecting the green leaf to steam pressure (for approximately one hour) to break down the incrusting matter, then subjecting the leaf to mechanical pressure, washing and picking the fibers, and then agitating the same while in a drier.

5. The process of isolating and treating fibers of the lechuguilla plant or related fiber bearing species for the subsequent manufacture of resilient pads, which consists in subjecting the plant in its green state to the action of confined steam pressure to thereby break down the incrusting tissues, sterilize the fiber and liberate the calcium derivatives and lignified portions of the fiber, then subjecting the so-treated leaf to pressure rolls to remove the incrusting tissue, washing the resultant fibers, straightening the same and properly drying them while in the separator, and finally completely drying the fibers to drive off any moisture within the fiber and at the same time agitating the fiber to cause the same to curl.

6. The method of recovering and treating fibers of the lechuguilla plant, which consists in decomposing the leaf, then extracting the fibers by mechanical scraping and pressure, washing and dyeing the fibers, subjecting the fibers to a wet picker and to a preliminary draft of hot air while in their moist condition, and finally subjecting the fibers to a drying action until such time as each individual fiber is thoroughly dried.

GUSTAV JEAN NORD.